(12) United States Patent
Gorajala Chandra

(10) Patent No.: US 11,791,550 B2
(45) Date of Patent: Oct. 17, 2023

(54) ACCESS POINT WITH MODULAR INTERNAL/EXTERNAL ANTENNA SUPPORT

(71) Applicant: Fortinet, Inc., Sunnyvale, CA (US)

(72) Inventor: Sekhar Sumanth Gorajala Chandra, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 7 days.

(21) Appl. No.: 17/517,648

(22) Filed: Nov. 2, 2021

(65) Prior Publication Data

US 2023/0133291 A1   May 4, 2023

(51) Int. Cl.
*H01Q 1/22* (2006.01)
*H01Q 1/42* (2006.01)
*H04W 88/08* (2009.01)

(52) U.S. Cl.
CPC .......... *H01Q 1/421* (2013.01); *H01Q 1/2291* (2013.01); *H04W 88/08* (2013.01)

(58) Field of Classification Search
CPC ..... H04W 88/08; H01Q 1/2291; H01Q 1/243; H01Q 5/48; H01Q 9/0407; H01Q 9/065; H01Q 9/16; H01Q 9/285; H01Q 21/062
See application file for complete search history.

(56) References Cited

U.S. PATENT DOCUMENTS

| | | | |
|---|---|---|---|
| 9,761,958 B2* | 9/2017 | Bharghavan | H01Q 1/521 |
| 2005/0156794 A1* | 7/2005 | Theobold | H01Q 21/20 |
| | | | 343/702 |
| 2011/0025567 A1* | 2/2011 | Qi | H01Q 1/245 |
| | | | 343/702 |
| 2017/0222303 A1* | 8/2017 | Naidu | A61N 1/3925 |

* cited by examiner

*Primary Examiner* — Awat M Salih
(74) *Attorney, Agent, or Firm* — LAW OFFICE OF DORIAN CARTWRIGHT; Dorian Cartwright

(57) ABSTRACT

An access point has a housing with at least one connector for at least one external antenna and at least one connector for at least one internal antenna. An RF controller detects whether the at least one external antenna is connected to the at least one connector for the at least one external antenna when an open circuit is closed. Responsive to detecting that the at least one external antenna is connected, a first mode in which the at least one internal antenna supports RF capabilities switches to a second mode wherein the at least one external antenna supports RF capabilities.

20 Claims, 6 Drawing Sheets

ACCESS POINT WITH MODULAR INTERNAL/EXTERNAL ANTENNA SUPPORT

FIELD OF THE INVENTION

The invention relates generally to computer devices and computer networking, and more specifically, to an access point with modular internal/external antenna support.

BACKGROUND

Traditional access points are typically manufactured as internal access point models or external access point models. External antennae for the external models protrude outside of a housing for access points, while internal antennae for the internal models are trucked inside the housing. Internal electronics support, and software interactions on a computing device can all be affected by the type of access point.

However, there is overhead in terms of maintaining additional access point models, one with internal antenna and other with external antenna models, development cycle, SKU maintenance and implementation, and the like. Additionally, when a customer purchases an internal antenna model, it is not possible to later change to an external antenna based on the location and wireless performance. In general, changes in network installations or transferring gear across multiple branches has limitations under the current deployments.

Therefore, what is needed is a robust access point with modular internal/external antenna support.

SUMMARY

These shortcomings are addressed by the present disclosure of methods, computer program products, and systems for an access point with modular internal/external antenna support.

In one embodiment, an access point has a housing with at least one connector for at least one external antenna and at least one connector for at least one internal antenna. The at least one external antenna has a higher gain than the at least one internal antenna. A PCB (printed circuit board) within the housing and comprising at least one input/output for the internal antenna and at least one input/output for the external antenna. The at least one input/output for the external antenna is connected to the at least one connector for at least one external antenna on the PCB. A processor is coupled to the PCB.

In another embodiment, an RF (radio frequency) controller detects whether the at least one external antenna is connected to the at least one connector for the at least one external antenna when an open circuit is closed. Responsive to detecting that the at least one external antenna is connected, a first mode in which the at least one internal antenna supports RF capabilities switches to a second mode wherein the at least one external antenna supports RF capabilities.

Advantageously, computer hardware performance and network performance are improved with adaptable access points. Furthermore, there is a cost savings for entities

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems an access point with modular internal/external antenna support. One of ordinary skill in the art will recognize many additional variations made possible by the succinct description of techniques herein.

I. Access Point Device with Dual Antenna Support (FIGS. 1-4)

Figure 1A:
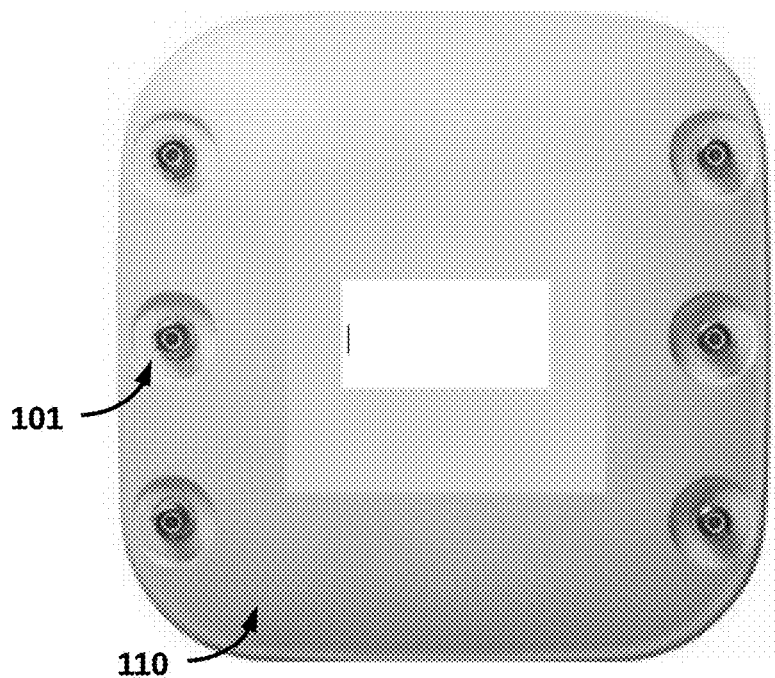
FIGS. 1A and 1B are perspective illustrations of an access point with external and internal antenna support, with and without a faceplate, according to an embodiment.
Figure 1B:
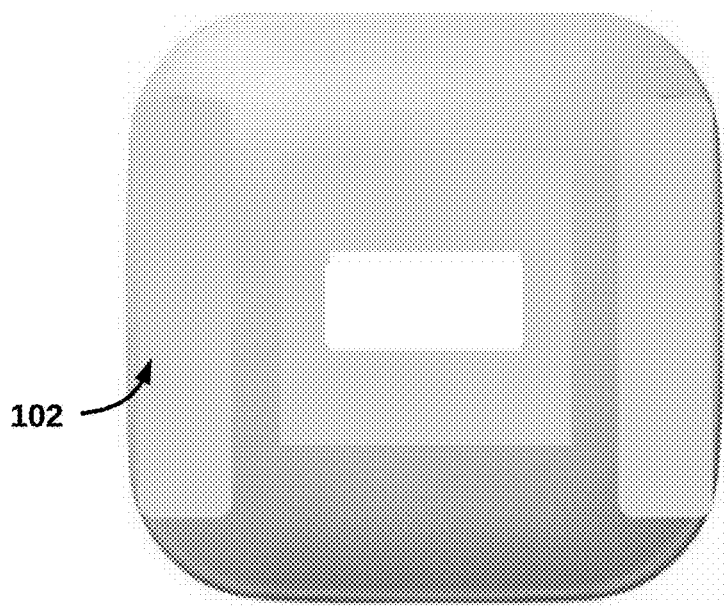
Figure 2:
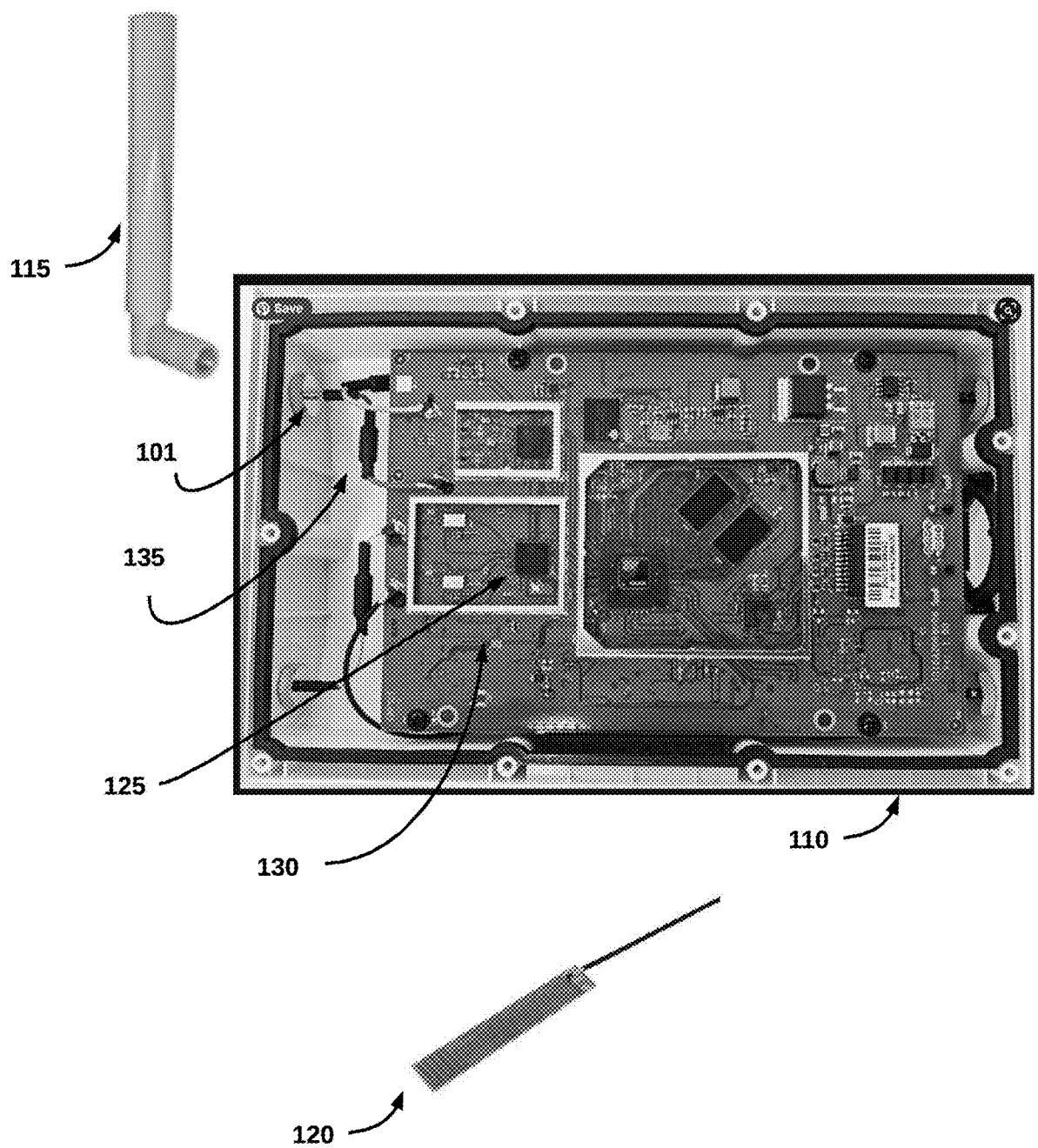
FIG. 2 is a perspective illustration of a PCB board inside the access point of FIGS. 1A and 1B, according to an embodiment.

FIGS. 1A and 1B are perspective drawings of an access point 100, according to an embodiment. A housing 110 is shown in FIG. 1A with grommets 101 for connecting external antennae 115 to the access point 100. In this case, there are six grommets but in other cases there may be 1, 2, 4 or 8, or any other appropriate number of grommets. External antennae 115 can be screwed, snapped on or attached to grommets in other manners. The housing 110 can be composed of plastic, rubber, metal, or a combination. The housing 110 can be rated IP65 for protection against law pressure water jets and condensation, in outdoor environments.

A face plate 120 has been added to the housing 110 in FIG. 1B to cover the grommets 101. When deployed with internal antennae, access to the grommets 101 is not necessary. The face plate 120 can protect the grommets 101 from unnecessary wear and tear and also increase the aesthetics in deployments with many access points in visible areas, such as an office building. The face plate 120 can snap on, screw on, or otherwise attach to the housing 110.

A PCB board 130 inside the housing 110 connects wires 135 from inside the grommets to transmit and receive RF signals of external antenna. Additionally, the PCB board 130 connects wires to transmit and receive RF signals of internal antenna 120. When connected, the internal antenna 120 can be mounted against an inside wall of the housing 110. The PCB board 130 includes trace connectors between the Wi-Fi processors or other PHY processors for signal processing according to protocol (e.g., IEEE 802.11 or Bluetooth). The PCB board 130 further includes trace connectors between the Wi-Fi processor 125 and a CPU.

The Wi-Fi processor 125 can include an RF controller to detect whether the at least one external antenna is connected to the at least one connector for the at least one external antenna when an open circuit is closed. The RF controller can also be a separate electronic. Responsive to detecting that the at least one external antenna is connected, the RF controller switches from a first mode in which the at least one internal antenna supports RF capabilities to a second mode in which the at least one external antenna supports RF capabilities. In other embodiments antenna switching is supported in software (see e.g., FIG. 3).

In another embodiment, mode switching occurs automatically in response to RF signal monitoring or other conditions. For example, SSID measurements with connected stations can be logged and compared against expected SSID levels for the context, as a trigger for switching from an internal antenna to a preinstalled external antenna. Other conditions can include error rates, network congestion, signal interference, and the like. In still other embodiments, mode switching can automatically occur in the other direction, from the external antenna to the internal antenna. One causation can be movement of the access point 100 from outdoors to indoors. A change in RF signal interaction, attenuation, SSID levels with stations, or other condition is detected and the same conditions are tested with the internal antenna. If performance of the second mode exceeds the first mode, the automatic change can be committed. In an embodiment, the access point 100 may detect being indoors by temperature, wind, and user setting (i.e., manual configuration) when first powered up, and automatically make indoors the default setting.

Figure 3:
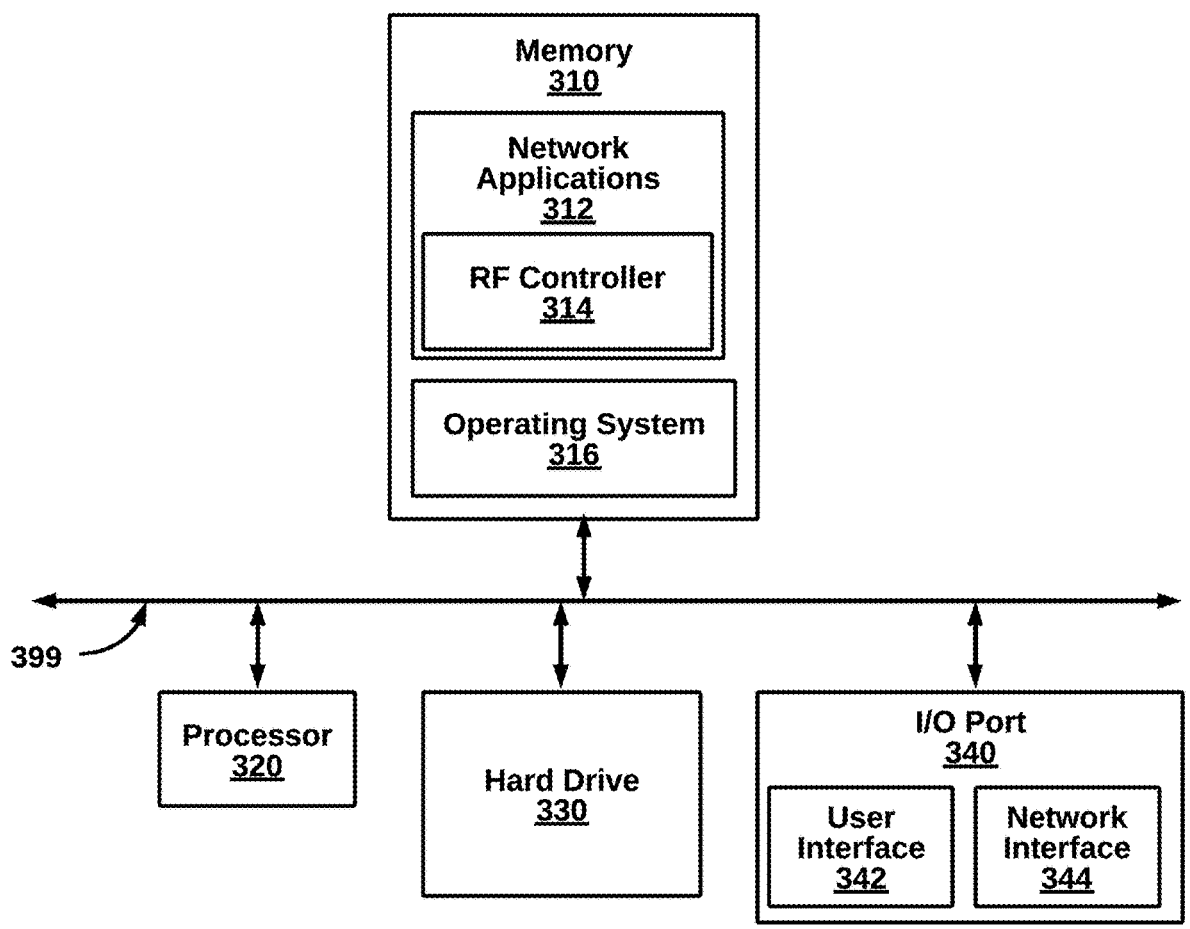
FIG. 3 is a high-level block diagram illustrating an access point with modular internal/external antenna support, according to an embodiment.

FIG. 3 is a high-level block diagram illustrating illustration of the access point 100 with internal hardware, according to an embodiment. The access point 100 includes a memory 310, a processor 320, a storage drive 330, and an I/O port 340. Each of the components is coupled for electronic communication via a bus 399 on a PCB. Communication can be digital and/or analog and use any suitable protocol. The access point 100 can be implemented by a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The memory 310 further comprises network applications 312 and an operating system 314. The network applications 312 can include a web browser, a mobile application, an application that uses networking, a remote application executing locally, a network protocol application, a network management application, a network routing application, or the like.

In one embodiment, the network applications 312 includes a user interface allowing a choice between internal and external antennas. When a user makes the selection, redirection of RF signaling from one antenna to a different antenna, is initiated in software and then implemented in hardware. In an alternative embodiment, redirection of RF signaling is initiated in hardware, for example, when external antennas are connected and disconnected.

An operating system 314 within the memory 310 facilitates software processes. Standard components of the operating system 314 can include an API module, a process list, a hardware information module, a firmware information module, and a file system. The operating system 314 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 320 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 320 can be single core, multiple core, or include more than one processing elements. The processor 320 can be disposed on silicon or any other suitable material. The processor 320 can receive and execute instructions and data stored in the memory 310 or the storage drive 330.

The storage drive 330 can be any non-volatile type of storage such as a magnetic disc, EEPROM (electronically erasable programmable read-only memory), Flash, or the like. The storage drive 330 stores code and data for applications.

The I/O port 340 further comprises a user interface 342 and a network interface 344. The user interface 342 can output to a display device and receive input from, for example, a keyboard. The network interface 344 (e.g., an RF antennae or an Ethernet port) connects to a medium such as Ethernet, Bluetooth, or Wi-Fi for data input and output, can may be controlled by a PHY processor, as described herein. Many of the functionalities described herein can be implemented with computer software, computer hardware, or a combination.

Figure 4:
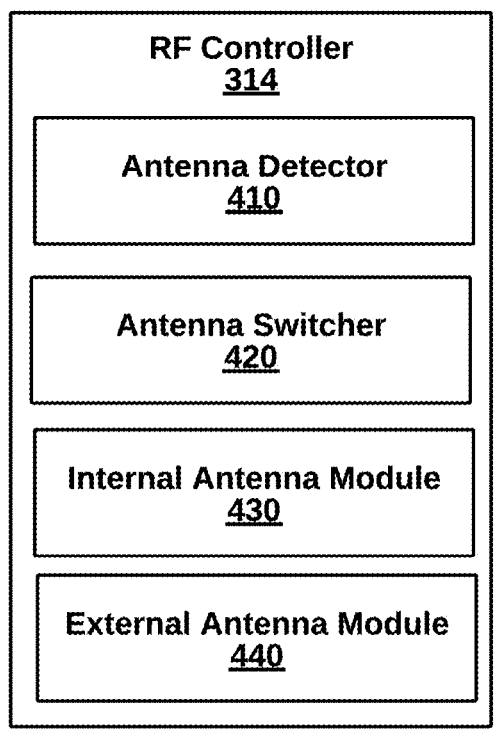
FIG. 4 is a more detailed block diagram illustrating of an RF controller of the system of FIG. 3, according to an embodiment.

FIG. 4 is a more detailed illustration of an RF controller 314 of the network applications 312 of FIG. 3. The RF controller 314 includes an antennae detector 410, a mode switch 420, an internal antenna module 430 and an external antenna module 440. The modules can be implemented in source code stored in non-transitory memory executed by a processor. Alternatively, the modules can be implemented in hardware with microcode. The modules can be singular or representative of functionality spread over multiple components. Many other variations are possible.

The antenna detector 410 is able to identify when external antenna are connected. In one embodiment, a PCB includes open circuits that are closed when the external antenna provide an electrically conductive route past the open circuit. The antenna detector 410, in another embodiment, becomes aware of messages being sent by components along the new circuit. Many other variations are possible within the spirit of the current disclosure.

The mode switch 420 responds to a notification that the external antenna have been connected, in one case, by switching RF signals responsibility from a first module to a second module. More specifically, when external antenna are not connected, the internal antenna module 430 is activated for RF signal exchanges with the channel. On the other hand, when external antenna are connected, the external antenna module 440 is activated for RF signal exchanges with the channel. Some embodiments also respond to a notification that the external antenna have been disconnected. As a result, the RF responsibility switches back from the second module to the first module.

Users may wish to alternate between internal and external antennas at different times and in different configurations. But when the number of obstacles increases, as can be the case indoors, indoor antennas can work better (e.g., MIMO technology). Further, external dipole antennas have blind zones in the signal pattern compared to the more uniform spherical coverage provided by indoor antennas.

The internal antenna module 430 can be a default mode that uses an internal antenna. Internal antennas are located inside the device and are usually not visible to the user, such as internal PIFA antennas.

The external antenna module 440. External antennas are typically dipole with two identical conductive elements/poles. For outdoors, external dipole antennas with directional control can provide a stronger signal of having higher gain when there are fewer obstacles.

II. Access Point Methods for Dual Antenna Support (FIGS. 5-6)

Figure 5:
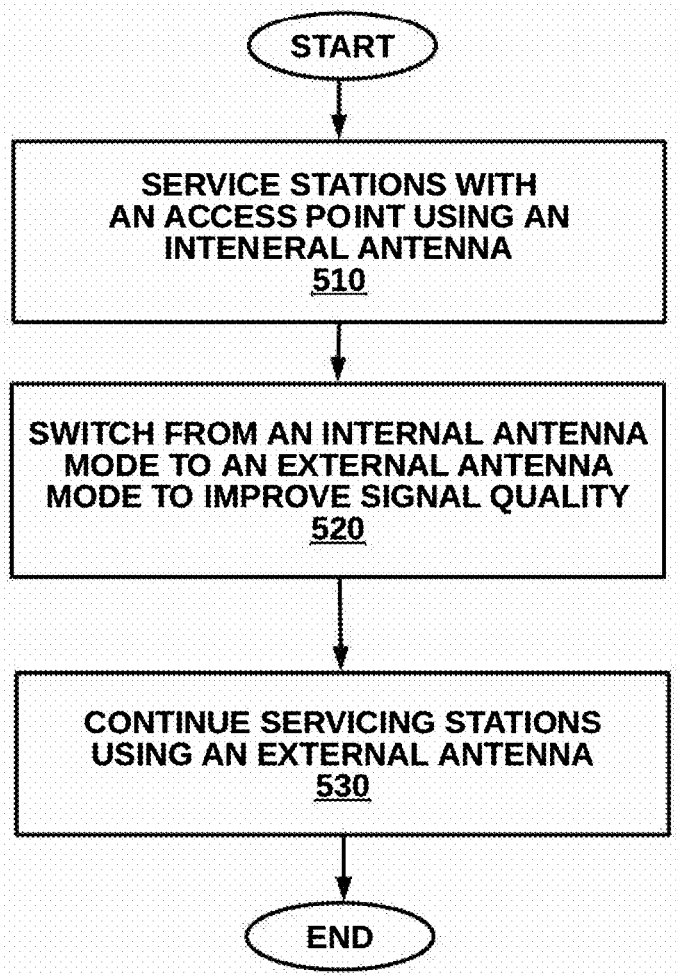
FIG. 5 is a high-level flow diagram illustrating a method for modular internal/external antenna support for an access point, according to one preferred embodiment.
Figure 6:
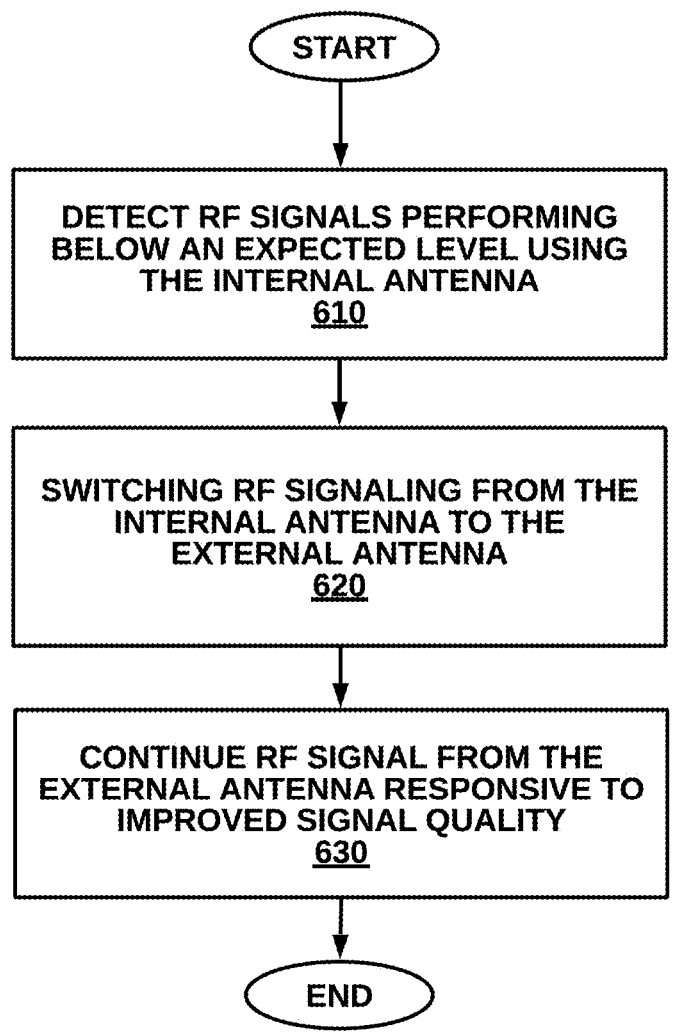
FIG. 6 is a more detailed flow diagram illustrating a step of providing internal and external antenna support for an access point, for the method of FIG. 5, according to one embodiment.

FIG. 5 is a high-level flow diagram illustrating a method for modular internal/external antenna support for an access point, according to one preferred embodiment. The method 500 can be implemented, for example, by the access point 100 of FIG. 1. The steps are merely representative groupings of functionality, as there can be more or fewer steps, and the steps can be performed in different orders. Many other variations of the method 500 are possible.

At step 510, an access point operating in a first mode with indoor antenna is determined to have low signal quality. The access point has a housing with at least one connector for at least one external antenna and at least one connector for at least one internal antenna is provided. The at least one external antenna has a higher gain than the at least one internal antenna. A PCB is provided within the housing and comprising at least one input/output for the internal antenna and at least one input/output for the external antenna is provided. The at least one input/output for the external antenna is connected to the at least one connector for at least one external antenna on the PCB.

As a result of the low signal quality determination, the access point is switched from an internal antenna mode to an external antenna mode, at step 520, as further detailed in FIG. 5 below. The switch can be implemented in hardware and/or software. At step 530, the access point continues operations in a second mode.

Turning to FIG. 6 an automated process is for antenna switching illustrated. At step 610, RF signals and various network conditions are monitored and compared against expected levels. In one embodiment, expected levels are iteratively updated as real-time data is collected.

At step 620, a signal quality monitor detects that the RF signals are performing below an expected level in the first mode and the second mode operates at the expected level or at least higher than the first mode. In other embodiments, rather than automatically reacting to thresholds, the access point reacts to at least one external antenna being manually connected to the at least one connector for the at least one external antenna when an open circuit is detected as closed. In another manual embodiment, a network administrator clicks a button in a user interface to change the configuration when external antennas are preinstalled.

At step 630, a first mode in which the at least one internal antenna supports RF capabilities switches to a second mode in which the at least one external antenna supports RF capabilities. An electronic multiplier directs RF signals in one case from a single Wi-Fi processor. In another case, an electronic multiplier directs signals between two Wi-Fi processors, one for internal antenna control and one for external antenna control.

III. General Considerations

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. An access point with dual modular support for internal and external antennas providing wireless channel access on a data communication network for communications with one or more stations, the access point comprising:
    a housing with at least one connector for at least one external antenna and at least one connector for at least one internal antenna, wherein the at least one external antenna has a higher gain than the at least one internal antenna;
    a PCB (printed circuit board) within the housing and comprising at least one input/output for the internal antenna and at least one input/output for the external antenna, wherein the at least one input/output for the external antenna is connected to the at least one connector for at least one external antenna on the PCB;
    a processor coupled to the PCB; and
    an RF (radio frequency) controller coupled to the PCB to detect whether the at least one external antenna is connected to the at least one connector for the at least one external antenna when an open circuit is closed, and responsive to detecting that the at least one external antenna is connected, switching from a first mode in which the at least one internal antenna supports RF capabilities to a second mode in which the at least one external antenna supports RF capabilities.

2. The access point of claim 1, wherein the housing further comprises a face plate to cover the at least one connector for the at least one external antenna when not in use, and to provide access when in use.

3. The access point of claim 1, wherein at least one connector for at least one external antenna comprises six connectors for six external antennae.

4. The access point of claim 1, wherein the RF controller is part of a Wi-Fi processor coupled to the PCB.

5. The access point of claim 1, further comprising a memory, wherein the RF controller is stored as code in the memory and executed by the processor.

6. The access point of claim 1, further comprising an RF monitor to monitor quality of RF signals,
    wherein the RF controller switches from the first mode to the second mode is responsive to detecting RE signal quality falling below a threshold and detecting the connected at least one external antenna.

7. The access point of claim 1, further comprising a user interface with an antenna control option,
    wherein the RF controller switches from the first mode to the second mode responsive to receiving an input from the user interface for the antenna control option.

8. The access point of claim 1, wherein the access point is further coupled to the Internet and handles transferring data packets between resources on the Internet and stations on the wireless data network.

9. A method in an access point with dual support for internal and external antennas for wireless channel access on a data communication network for communications with one or more stations, the method comprising the steps of:
    providing a housing with at least one connector for at least one external antenna and at least one connector for at least one internal antenna, wherein the at least one external antenna has a higher gain than the at least one internal antenna;
    providing a PCB within the housing and comprising at least one input/output for the internal antenna and at least one input/output for the external antenna, wherein the at least one input/output for the external antenna is connected to the at least one connector for at least one external antenna on the PCB (printed circuit board);
    providing a processor coupled to the PCB;
    detecting whether the at least one external antenna is connected to the at least one connector for the at least one external antenna when an open circuit is closed; and
    responsive to detecting that the at least one external antenna is connected, switching from a first mode in which the at least one internal antenna supports RF capabilities to a second mode in which the at least one external antenna supports RF capabilities.

10. The method of claim 9, wherein the housing further comprises a face plate to cover the at least one connector for the at least one external antenna when not in use, and to provide access when in use.

11. The method of claim 9, wherein at least one connector for at least one external antenna comprises six connectors for six external antennae.

12. The method of claim 9, wherein the RF controller is part of a Wi-Fi processor coupled to the PCB.

13. The method of claim 9, wherein the RF controller is stored as code in a memory and executed by the processor.

14. The method of claim 9, further comprising monitoring quality of RF signals,
    wherein the RF controller switches from the first mode to the second mode is responsive to detecting RF signal quality falling below a threshold and the detecting the connected at least one external antenna.

15. The method of claim 9, further comprising switching from the first mode to the second mode responsive to receiving an input from a user interface for the antenna control option, the user interface comprising an antenna control option.

16. The method of claim 9, wherein the access point is further coupled to the Internet and handles transferring data packets between resources on the Internet and stations on the wireless data network.

17. A non-transitory computer-readable media in an access point, implemented at least partially in hardware, with dual support for internal and external antennas for wireless channel access on a data communication network for communications with one or more stations, the method comprising the steps of:
    providing a housing with at least one connector for at least one external antenna and at least one connector for at least one internal antenna, wherein the at least one external antenna has a higher gain than the at least one internal antenna;

providing a PCB within the housing and comprising at least one input/output for the internal antenna and at least one input/output for the external antenna, wherein the at least one input/output for the external antenna is connected to the at least one connector for at least one external antenna on the PCB (printed circuit board);

providing a processor coupled to the PCB;

detecting whether the at least one external antenna is connected to the at least one connector for the at least one external antenna when an open circuit is closed; and responsive to detecting that the at least one external antenna is connected, switching from a first mode in which the at least one internal antenna supports RF (radio frequency) capabilities to a second mode in which the at least one external antenna supports RF capabilities.

18. The computer-readable media of claim 17, wherein the housing further comprises a face plate to cover the at least one connector for the at least one external antenna when not in use, and to provide access when in use.

19. The computer-readable media of claim 17, wherein at least one connector for at least one external antenna comprises six connectors for six external antennae.

20. The computer-readable media of claim 17, wherein the RF controller is part of a Wi-Fi processor coupled to the PCB.

* * * * *